(12) United States Patent
Hayes

(10) Patent No.: US 6,818,596 B1
(45) Date of Patent: Nov. 16, 2004

(54) DRY MIX FOR WATER BASED DRILLING FLUID

(76) Inventor: James Hayes, 143 Skylark La., Sunset, LA (US) 70584

( * ) Notice: Subject to any disclaimer, the term of this patent is extended or adjusted under 35 U.S.C. 154(b) by 216 days.

(21) Appl. No.: 09/957,523

(22) Filed: Sep. 19, 2001

(51) Int. Cl.$^7$ ................................................ C09K 7/00
(52) U.S. Cl. ....................... 507/120; 507/103; 507/106; 507/107; 507/138; 507/140; 507/141
(58) Field of Search ................................ 507/103, 106, 507/107, 120, 138, 140, 141, 203, 206, 267, 269, 277, 225

(56) References Cited

U.S. PATENT DOCUMENTS

| | | | | |
|---|---|---|---|---|
| 2,650,197 A | * | 8/1953 | Rahn | 507/107 |
| 2,775,557 A | * | 12/1956 | Morgan | 507/225 |
| 4,240,505 A | * | 12/1980 | Swanson | 507/225 |
| 4,420,405 A | * | 12/1983 | McCrary | 507/206 |
| 4,486,335 A | * | 12/1984 | Majewicz | 507/103 |
| 4,647,859 A | * | 3/1987 | Son et al. | 507/103 |
| 4,671,883 A | * | 6/1987 | Connell | 507/225 |
| H935 H | * | 7/1991 | Rines | 507/103 |
| 5,032,296 A | * | 7/1991 | Patel | 507/225 |
| 5,198,415 A | * | 3/1993 | Steiger | 507/103 |
| 5,325,922 A | * | 7/1994 | Cowan et al. | 166/293 |
| 5,333,690 A | * | 8/1994 | Nahm et al. | 166/291 |
| 6,017,856 A | * | 1/2000 | Ooyen | 507/141 |

* cited by examiner

*Primary Examiner*—Philip C. Tucker
(74) *Attorney, Agent, or Firm*—Roy, Kiesel, Keegan & DeNicola

(57) ABSTRACT

A drilling fluid or mud having several components, including leonardite (humic acid); potassium acetate; partially hydrolyzed polyacrylamide (PHPA); polyanionic cellulose polymer (PAC); sulfonated asphalt; sulfoalkylated tannin; polystyrene maleic anhydride copolymer; micronized cellulose fiber; calcium carbonate; and calcium carbonate. These components are preferably premixed in a dry formulation as a powder or as pellets, and shipped to the site in bags or bulk barrels. This offers substantial advantages over the prior art in that the drilling mud of the present invention may be formed simply by adding the dry mix to a predetermined amount of water, and is thus much easier to make than the prior art wet mix drilling fluids, which typically require precise ratios of several different powders and liquids to be mixed together. The humic acid serves as hydration buffer to help keep the powder or pellets dry and flowable.

46 Claims, No Drawings

DRY MIX FOR WATER BASED DRILLING FLUID

BACKGROUND OF THE INVENTION

1. Field of the Invention

The prior art relates to petroleum wells in general and to drilling fluids in particular.

2. Prior Art

Drilling muds or drilling fluids are used in drilling operations such as in the drilling of petroleum wells. The drilling apparatus comprises in the most general terms, a length of drill stem (the drill string) often having a rotary drill at its downhole end. Drilling fluid or "mud" is pumped through the well bore.

Every drilling mud is comprised of a base fluid and some combination of dry and or liquid components that are mixed into the base fluid to create a mud that has the desired components in the desired ratios. Typically, such mixing is done in the field, and involves the labor of many people and numerous bags, tanks, pails, mixing hoppers, mixing pumps, and hoses.

There are two main types of drilling mud: oil based muds (OBM) and water based muds (WBM). As their names imply, the two types of muds can be differentiated by the nature of their base fluids. Fresh or salt water makes up the base fluid in WBM's while diesel oil, mineral oils, or synthetic oils often serve as the base fluid for OBM's, although salt water is often emulsified into the base fluid with primary and secondary emulsifiers in OBM's.

The drilling mud must accomplish several tasks. One of the primary purposes of the drilling mud is lubrication. The drilling mud lubricates the drill bit, helping to prevent damage to the bit as it grinds through the earth. The drilling mud also lubricates the drill stem, preventing it from sticking to the walls of the well bore as it is rotated. Additionally, the drilling mud cools the bit and string, dissipating the heat generated by the drilling itself and the geothermal heat, where present.

As the drill bit rotates, it dislodges pieces of rock, clay, dirt, and etc, known as cuttings. Additionally, portions of the well bore may cave off from time to time. While such cavings are to be avoided, if possible, both the cavings and the cuttings must be removed. This is another function of the drilling fluid. As drilling mud is pumped through the well bore it picks up and carries these drill cuttings and cavings out of the well bore. Additionally, the drilling mud should be capable of suspending the cuttings in the drilling mud when circulation is stopped. If the drilling mud does not have enough gel strength to keep the cuttings in suspension, they will settle out of the drilling mud.

If the cuttings settle out of the drilling mud, they can collect in cutting beds—piles of cuttings and cavings that have collected at one point in the well bore. However, in directional drilling, the well bore can have one or more sections that are between horizontal and vertical. The low sides of these sections of the well bore are particularly susceptible to the formation of cutting beds, particularly in bends where the bore moves from a more vertical section to a more horizontal section. Cutting beds in these positions can bind the drill stem. This can impede rotation of the stem and impede steerage of the bit in directional drilling. Cutting beds can also impede the insertion of additional drill stem or the removal of drill stem that is already in place. Similarly, cutting beds can cause the bit or other downhole tools to become stuck as well. Thus, it is important for a drilling mud to minimize the rate at which cuttings fall out of suspension when the circulation of the drilling mud stops.

Another requirement of the drilling mud is to help hold up the well bore walls. The drill bit necessarily cuts a hole in the earth that is slightly larger than the diameter of the drill stem. The drilling mud circulating in the well bore provides support to the well bore walls and prevents them from collapsing.

Instability in the well bore is an especially frequent problem in shale formations. Shales are complex clay rich geological sediments. Their notorious instability is believed to arise from the fact that some of the minerals responsible for cementing the shale components together are at least partially soluble in water. Adding water to these components will cause them to swell and dissolve, thereby reducing the forces holding the shale together and resulting in its deterioration. Conversely, drying the shale will increase the cementing effect the minerals have on the shale, causing the shale to harden and strengthen. The instability of a shale will vary directly in proportion to the amount of time spent in open hole operation—that is, the amount of time with no casing separating the drilling mud in the well bore from the formation.

One clay mineral that is especially problematic is sodium montmorillonite, also known as swelling bentonite. Sodium montmorillonite is especially problematic because it expands to several times its original volume when it encounters water. Thus, the water in a WBM pumped through shale formation can cause the sodium montmorillonite in the well bore wall to swell substantially. Such swelling can weaken the bond between the clay particles and the other components of the shale. This can cause the well bore wall to slough off or to collapse altogether. Additionally, the swelling of the clay particles can cause the well bore diameter to shrink, such that it may restrict the drill string or actually cause the drill string or any number of downhole tools to become stuck. Also, when the clay particles enter the drilling mud and swell, they can increase the drilling mud viscosity beyond desirable levels, which can increase the well bore pressure, making the mud more difficult to pump and simultaneously increasing stress on the well bore, leading to increased risk of well bore erosion or collapse and/or loss of drilling fluid to the surrounding formation through the well bore walls. Shales high in sodium montmorillonite, and thus especially susceptible to the foregoing problems, are commonly encountered in the Gulf of Mexico and the North Sea.

When well bores are expected to encounter shale formations, drillers will often use an OBM to reduce the exposure of the shale to water. However, the cost of using an OBM is significantly greater than WBM's because of the cost of the base fluid. Additionally, OBM's and their cuttings are subject to more rigorous environmental treatment than their WBM counterparts.

Another function of the drilling mud is counteracting the pressure of the formation. When petroleum reservoirs are encountered during drilling, they may be under significant pressure. These pressures will tend to assault the bore wall, potentially causing it to implode and also potentially forcing the petroleum product into the well bore. One way of addressing the problem is by increasing the density of the drilling mud. This will counter the pressurized formations encountered downhole, neutralize the pressure on the well bore wall, and prevent the petroleum products from escaping into the well bore.

The well bore may pass through many different types of soil, rock, shale and sand. Although some of these formations will be pressurized as discussed above, others will not be pressurized or will be under less pressure than the drilling mud. In such cases, a common and expensive problem is the loss of drilling mud to the formation. Although problematic in WBM's and OBM's these types of losses are particularly troublesome in OBM's. However, with either mud type, the mud is lost in the same manner. Fractures or porous soil materials essentially act like leaks in the well bore, allowing the drilling mud to simply flow out of the bore. It is important to minimize such losses. To this end, the drilling mud is configured to deposit a thin filter cake on the walls of the well bore.

The filter cake is a thin layer of non-water permeable or semi-permeable material at the wall of the well bore. It seals fractures in the formation that open into the well bore and otherwise acts as a barrier between the well bore and the formation through which the well bore passes. To the extent that the formation is porous or otherwise capable of receiving fluids under pressure, the drilling fluid will run out of the well bore into the surrounding formation. However, as the drilling fluid runs out of the well bore, items that are not in solution will be carried with the drilling fluid to the well bore wall. Those items that are too large to pass through the pores of the formation will clog the pores and become caked to the well bore wall, forming the filter cake, which will inhibit further fluid flow out of the well bore. The water phase of the drilling fluid that is squeezed through the filter cake is called mud filtrate. The object of the filter cake is to minimize the amount of mud filtrate that escapes from the well bore.

Another problem that arises in low pressure formation is differential sticking. This occurs when the pressure of the drilling mud exceeds the pressure of the surrounding formation, and the resultant difference in pressure forces the drill stem against the well bore wall. The pressure exerted against the drill stem by the drilling mud can be sufficient to bind the drill stem, causing it to become stuck. The drilling mud should be configured to prevent or inhibit flow into such low pressure sands in order to prevent differential sticking as well as the accompanying mud loss.

The drill string is typically composed of dozens if not hundreds of sections of approximately thirty-one foot sections of steel pipe. The weight of such a length of pipe is significant. Another of the many purposes of the drilling mud is to help to support this weight, through its buoyancy.

Although there are many known drilling mud compositions that can achieve one or more of the foregoing requirements, obtaining such a drilling mud in the field can be difficult. Many drilling fluids additives must be transported in liquid form because of the hydroscopic nature of their ingredients. This takes up significant shipping space and makes handling the additives more difficult. Additionally, as mud engineers attempt to optimize a drilling mud to match the particular conditions encountered on site, they may consume a disproportionate amount of a particular mud component. Because of the remote locations where petroleum exploration is frequently conducted, shipping space is often at a premium. Thus, using an excess amount of a single component in an effort to match encountered conditions may cause the mud engineer to run short of that particular component. This can lead to expensive downtime while additional supplies of the component are sought. Therefore, a drilling fluid that meets the following objectives is desired.

OBJECTS OF THE INVENTION

It is an object of the invention to provide a drilling fluid that is capable of lubricating the drilling bit.

It is another object of the invention to provide a drilling fluid that is capable of coating, lubricating, and inhibiting the hydration of well bore cuttings.

It is another object of the invention to prevent the drill bit and stabilizers from balling up with up with clay or shale.

It is another object of the invention to provide a drilling fluid capable of carrying drill cuttings out of the well bore.

It is another object of the invention to provide a drilling fluid configured to reduce cutting bed build up during the drilling of deviated wells.

It is still another object of the invention to provide a drilling fluid capable of supporting the well bore walls.

It is still another object of the invention to provide a drilling fluid configured to minimize well bore erosion.

It is yet another object of the invention to provide a drilling fluid capable of substantially sealing the well bore.

It is still another object of the invention to provide a drilling fluid capable of substantially inhibiting the hydration of shale formations.

It is still another object of the invention to provide a drilling fluid capable of forming a thin, tough, lubricated filter cake on the well bore wall.

It is still another object of the invention to provide a drilling fluid configured to inhibit differential sticking of the drill string and of wire-line tools.

It is yet another object of the invention to provide a drilling fluid capable of being used to hydraulically drive a mud motor.

It is a still further object of the invention to provide a drilling fluid that may be easily transported to remote locations.

It is still another object of the invention to provide a drilling fluid that may be easily prepared on site.

It is yet another object of the invention to provide a drilling fluid whose components may be stored in a dry powder.

It is still another object of the invention to provide a drilling fluid whose components may be easily pelletized.

SUMMARY OF THE INVENTION

The invention comprises a drilling fluid or mud having several components, including leonardite (humic acid); potassium acetate; partially hydrolyzed polyacrylamide (PHPA); low viscosity polyanionic cellulose polymer (PAC); sulfonated asphalt; sulfoalkylated tannin; polyacrylate copolymer and/or maleic anhydride copolymer; micronized cellulose fiber; calcium carbonate; slaked lime; potassium carbonate; bentonite; and xanthan gum. These components are preferably premixed in a dry formulation, and shipped to the site in bags or bulk tanks. In one preferred embodiment, the leonardite, potassium acetate, PHPA, PAC and sulfonated asphalt may be mixed as one composite additive and the remaining ingredients mixed as a second additive.

This offers substantial advantages over the prior art in that the drilling mud of the present invention may be formed simply by adding a predetermined amount of the dry mix to water, and is thus much easier to make than the prior art wet mix drilling fluids. Mixing liquid components also typically requires multiple tanks, hoses, stands and connections, and close supervision during mixing. Moreover, spills frequently occur in mixing these prior art mud components. The components of many prior art liquid additives include oil based carriers. As a result, when they are spilled, a dangerous slip and fall condition is often created. No such condition is created by a spill of the dry components of the present invention.

Furthermore, because of the remoteness of many drilling sites, shipping can be a problem. Transporting the drilling fluid additives to the drilling site in a dry form will take up much less space both in transit and during storage on site, allowing the ingredients for a large amount of fluid to be brought in at once and stored on site through the duration of the project.

The foregoing advantages complement each other. As stated above, when liquid additives are used, on site personnel will make up the drilling fluid by combining preset ratios of several components, typically in large quantities using several tanks, hoses, and etc. Given the difficult conditions under which many wells are drilled, errors frequently arise in the mixing process, often resulting in excess quantifies of one or more components being spilled or added to the drilling mud mixture. This can lead to a premature consumption of one or more key ingredients and to the well site being effectively out of drilling fluid because one drilling fluid component has run out. Because the drilling operation cannot run without drilling fluid, drilling will effectively be stopped while more of the missing component is sought which, given the remoteness of some drill sites, can take a significant amount of time. Such delays can constitute a substantial expense, as many drilling rigs cost anywhere from several thousand to several hundred thousand dollars (U.S.) per day. Thus, having a dry mix drilling mud in which all or substantially all of the components are premixed and which can be prepared merely by adding a dry powder to water, will eliminate the possibility that the drilling mud will run out simply because one component has been prematurely consumed.

Additionally, the ability to transport the drilling mud in a dry form will make it easier to carry excess drilling fluid mix to a well site at the commencement of drilling, and thus to insure against running out of drilling fluid by keeping excess stock on hand. The volume of the individual liquid components, the limited shipping space, and the limited storage on many well sites made shipping excess drilling fluid to a site difficult with many prior art wet mix drilling fluids. The present invention will make it much easier to keep sufficient inventory on hand in order to guard against premature consumption of the drilling fluid.

The use of dry mix drilling fluid additives is complicated by the fact that several common drilling mud components, particularly PHPA and potassium acetate, are quite hydroscopic. When these components are included in a powder, the powder absorbs water from the atmosphere and forms clumps, solid blocks, or particularly in the case of potassium acetate and PHPA, soupy semi-liquids, after only a short exposure to the atmosphere. While such hydration can be avoided through careful storage practices, the conditions at most drilling sites makes this at least impractical, if not impossible. Consequently, many prior art drilling fluid additives have been provided in liquid form. By adding a hydration buffer to the mixture disclosed herein, the inventor has discovered that he can maintain the mixture in a flowable powder form, allowing him to achieve all of the advantages of a dry mix drilling fluid.

DETAILED DESCRIPTION OF THE INVENTION

The invention is a water based drilling fluid or drilling mud having several components. The first is a shale stabilizer. This component inhibits the absorption of water by the shale. Shale is made of several different types of material. When the clay components such as sodium montmorillonite absorb water, they swell. Swelling by one shale component but not the others weakens the entire shale structure and can cause large pieces of the shale to cave into the well bore. Thus, by preventing clay components from absorbing water, the entire shale formation is stabilized.

Also, as the drill bit passes through a shale formation, it will discharge shale cuttings into the well bore. If these cuttings absorb too much water in the drilling mud, the drilling mud will thicken which can result in an unintentional and excessive increase in the circulating mud pressure. The shale stabilizer in the drilling mud inhibits the absorption of water by the shale cuttings as well as the shale formation at the well bore walls.

The shale stabilizers are very hydrophillic. The inventor's preferred shale stabilizers are potassium acetate and a low molecular weight (1 to 8 million and preferably between 6 and 8 million) partially hydrolyzed polyacrylate-polyacrylamide copolymer (PHPA). Suitable PHPA can be obtained from Ciba Specialty Chemicals Corp. of Suffolk, Va.

The PHPA copolymer has numerous polar functional groups. These polar functional groups are believed to allow the PHPA to form a coating over the shale in the well bore wall as well as to encapsulate the shale particles in the mud stream. This PHPA coating or encapsulation, as the case may be, has several effects. First, it prevents further hydration of the shale formation or cuttings by direct contact with the drilling mud. Second, it seals the fractures and pores in the surface of the shale formation and cuttings, closing the shale to capillary movement that would allow mud filtrate into the formation. When the PHPA coats the shale cuttings in the mud, it lubricates them and prevents them from sticking to one another. This prevents the cuttings from collecting or "balling" on the bit or the stabilizers. Preventing the cuttings from sticking to drill string components lessens the chances that the components will become stuck in the well bore and simultaneously makes it more likely that the cuttings themselves will be circulated out of the well bore with the mud so they can be removed at the surface. The PHPA coating also inhibits the dispersion of the shale cuttings by preventing them from breaking into small pieces which are often difficult if not impossible to remove from the mud. Also, by lubricating the cuttings, the PHPA helps to prevent them from scouring the well bore wall as the mud flows through the bore.

In the preferred embodiment, the PHPA is provided in the drilling mud in concentrations between about 0.71 grams per liter and about 5.71 grams per liter and more preferably in concentrations between about 1.4 and about 2.8 grams per liter. As discussed in more detail below, the preferred embodiment of the invention is a dry drilling mud additive, which is mixed into water to make the drilling mud. To achieve the desired concentration, between about 0.25 and about 2.0 pounds of PHPA and preferably between about 0.5 and about 1.0 pounds of PHPA should be added per barrel (42 gallons) of water.

The preferred embodiment of the present invention also includes a second shale stabilizer in the form of an alkali metal acetate, preferably potassium acetate ($KC_2H_3O_2$). Suitable potassium acetate can be obtained from Jarchem Industries, Inc. of Newark, N.J. The potassium ion is a good shale stabilizer. Its size is believed to allow it to fill the interstitial spaces in the clay platelet, tetrahedral sheets that make up the clay, and thereby physically block capillary hydration of the shale. Additionally, when potassium acetate is dissolved in the water based mud, potassium and acetate ions are released. The increased concentration of solute in the mud is believed to reduce the osmotic pressure of the mud across the filter cake, thereby reducing the osmotic flow of mud filtrate from the mud to the formation. Also, potassium ions are believed to be able to displace sodium ions in the shale, making the shale more stable.

In the preferred embodiment, the potassium acetate is provided in the drilling mud in concentrations of between about 2.9 grams per liter and about 14.3 grams per liter and more preferably in concentrations between about 5.7 and about 11.4 grams per liter. As discussed in more detail below, the preferred embodiment of the invention is a dry drilling mud additive, which is mixed into water to make the drilling mud. To achieve the desired concentration, between about 1 and about 5 pounds of potassium acetate and preferably between about 2 and about 4 pounds of potassium acetate should be added per barrel (42 gallons) of water.

Shale stabilizers such as PHPA and potassium acetate are hydroscopic. As a result, they typically do not form very stable powders. In fact, powders of potassium acetate and/or PHPA typically absorb water from the atmosphere very rapidly. As a result, such powders left open will quickly develop lumps, large blocks, or semi-liquid globs, depending on the humidity and the length of time they are exposed to the atmosphere. Thus, storing shale stabilizers in a flowable powder form is difficult under ideal conditions, and nearly impossible under the conditions that petroleum exploration is often conducted, such as the high humidity encountered on offshore drilling platforms. For this reason, shale stabilizers, and drilling mud components in general are typically stored, transported, and mixed in solution.

The inventor has discovered that the addition of hydration buffers, such as humic acid, a principle component of leonardite (also known as lignite), can prevent the hydroscopic drilling fluid components from caking or clumping, keeping the entire mix a dry flowable powder. Humic acid is known to block electrostatic interaction. This is believed to inhibit the wetting of the other mixture components. Suitable leonardite can be obtained from Black Hills Bentonite, Inc. of Mills, Wyo.

The buffers are believed to inhibit clumping partly by preventing shale inhibitors from absorbing water from the atmosphere, as discussed above, and partly by simply being homogeneously mixed with the shale inhibitors and other hydrophilic particles in sufficient quantity to prevent those particles that have absorbed water from the atmosphere from being able to physically combine with one another to any significant degree.

In addition to serving to keep the mixture components from clumping, the buffers also have a functional effect in the drilling mud, once water is added. Humic acid is known to make clays unwettable. Thus, the humic acid in leonardite and other buffers will help prevent the mud filtrate from being absorbed by the clays in the shale encountered in the well bore. This will protect the shale and reduce the loss of mud filtrate.

Humic acid also improves the compressibility and lessens the permeability of the filter cake. Humic acid also improves the ability of the mud to remain fluid at high temperatures—above about 250° F. The operational advantages that the mud derives from humic acid at high temperatures primarily comes from the fact that humic acid does not break down at elevated temperatures as readily as some other drilling mud components, and thus the humic acid continues to perform the above described functions at higher temperatures while some other mud components may not.

In the preferred embodiment, leonardite is provided in the drilling mud in concentrations between about 5.7 grams per liter and about 42.9 grams per liter and more preferably in concentrations between about 22.9 and about 37.1 grams per liter. As discussed in more detail below, the preferred embodiment of the invention is a dry drilling mud additive, which is mixed into water to make the drilling mud. To achieve the desired concentration, between about 2 and about 15 pounds of leonardite and preferably between about 8 and about 13 pounds of leonardite should be added per barrel (42 gallons) of water.

It should be noted that although the foregoing concentrations are given in terms of leonardite, the principle active ingredient in the leonardite is believed to be humic acid, which is believed to make up about 85 percent by weight of the leonardite. Thus, for example, 5.7 grams of leonardite would contain about 4.8 grams of humic acid. Similarly, 15 pounds of leonardite would contain about 12.8 pounds of humic acid.

The preferred embodiment of the drilling mud also includes a cellulose polymer, such as a low viscosity polyanionic cellulose polymer (PAC), available from Drilling Specialties, Co., LLC of Bartlesville, Okla., or carboxymethylcellulose (CMC), available from Aqualon Oilfield Chemicals, a division of Hercules, Inc., of Houston, Tex. The cellulose polymer will provide reduced mud filtrate loss by forming part of the filter cake. The cellulose polymer will also help to coat and lubricate shale formations and shale cuttings in the mud.

In the preferred embodiment, cellulose polymer in the form of PAC is provided in the drilling mud in concentrations between about 0.71 grams per liter and about 11.4 grams per liter and more preferably in concentrations of between about 2.9 and about 5.7 grams per liter. As discussed in more detail below, the preferred embodiment of the invention is a dry drilling mud additive, which is mixed into water to make the drilling mud. To achieve the desired concentration, between about 0.25 and about 4 pounds of cellulose polymer and preferably between about 1 and about 2 pounds of cellulose polymer should be added per barrel (42 gallons) of water.

The preferred embodiment of the drilling fluid also contains dry particulate sulfonated asphalt, available from Drilling Specialties Co., LLC of Bartlesville, Okla. The principle function of the asphalt is to stabilize shale formations by acting as a sealant, mechanically plugging and sealing the small fissures and pores in the formations lining the well bore and within the filter cake. In addition to forming part of the filter cake, the asphalt will increase lubricity of the mud, reduce friction, and coat cuttings in the mud. Although asphalt is preferred, there are several other known components that may be used in place of this ingredient including gilsonite (uintaite), carbon black, and graphite.

In the preferred embodiment, sulfonated asphalt is provided in the drilling mud in concentrations between about 5.7 grams per liter and about 28.6 grams per liter and more preferably in concentrations of between about 11.4 and about 22.9 grams per liter. As discussed in more detail below, the preferred embodiment of the invention is a dry drilling mud additive, which is mixed into water to make the drilling mud. To achieve the desired concentration, between about 2.0 and about 10.0 pounds of sulfonated asphalt and preferably between about 4.0 and about 8.0 pounds of sulfonated asphalt should be added per barrel (42 gallons) of water.

As the solids content of the mud and the temperature at the bottom of the well bore increase, the mud's yield point—i.e. the stress, measured in pounds force (lbf) per 100 square feet, required to maintain fluid movement—can become excessive. If the yield point is too high, the pressure exerted by the fluid will exceed the formation fracture gradient—the pressure at which the mud will cause the well bore wall to rupture. Suitable yield points range from about five to about twenty pounds of force per hundred square feet and preferably range from about eight to about twelve pounds of force per hundred square feet. To help keep the yield point in the desired range, a thinning rheology modifier may be included in the preferred embodiment.

A preferred thinning rheology modifier is sulfoalkylated tannin powder, which may be obtained from the Drilling Specialties Company of Bartlesville, Okla. Other suitable thinning rheology modifiers include lignosulfonate, copolymers of acrylic acid and polyacrylic acid, polystyrene maleic anhydride copolymer, and AMPS (2-acrylomido-2-methylpropane sulfonic acid) polymer. Humic acid also acts as a rheology modifier.

Where a large amount of clay is expected to be encountered during drilling, the mud's viscosity can be expected to increase as its clay content rises. In such circumstances, it may also be desirable reduce the mud's viscosity. A thinning rheology modifier may be employed for this purpose as well.

In addition to controlling yield point and viscosity, the rheology modifiers can also help regulate the mud's gel strength, i.e. the time it takes a fluid to begin acting like a gel when it becomes static. The ability of the mud to act like a gel is important because it is this characteristic that allows the mud to keep the mud solids in suspension when circulation is stopped. Increasing the mud gel strength will help the mud keep cuttings suspended, which in turn will help the mud carry the cuttings to the surface where they can be removed from the mud stream. The desired gel strength of the mud is preferably between about three and about twelve pounds of force per hundred square feet, and more preferably between about four and about six pounds of force per hundred square feet, as measured when the mud has been at rest for ten minutes.

It is desirable that the drilling mud be thixotropic, meaning that the mud should thin upon shearing but form a gel when at rest—preferably a relatively fragile gel. Gelation is needed so that the cuttings will not immediately fall out of suspension when the mud stops being pumped through the well bore. However, a relatively low gel strength is needed so that pumping may be recommenced without requiring pressures that would exceed the well bore fixture gradient. Thus, thinning rheology modifiers and gelling rheology modifiers are both included in the preferred embodiment.

In the preferred embodiment a sulfoalkylated tannin thinning rheology modifier is provided in the drilling mud in concentrations between about 1.4 grams per liter and about 14.3 grams per liter and more preferably in concentrations of between about 2.9 and about 11.4 grams per liter. As discussed in more detail below, the preferred embodiment of the invention is a dry drilling mud additive, which is mixed into water to make the drilling mud. To achieve the desired concentration, between about 0.5 and about 5.0 pounds of sulfoalkylated tannin rheology modifier and preferably between about 1.0 and about 4.0 pounds of sulfoalkylated tannin rheology modifier should be added per barrel (42 gallons) of water.

An additional thinning rheology modifier may be included in the preferred embodiment, preferably a polymer or copolymer of acrylic acid or of maleic anhydride, preferably having a molecular weight of less than about 50,000. These thinning rheology modifiers are used for the same purposes as the sulfoalkylated tannins discussed above, but these agents work at higher solids content and at higher temperatures than the tannis. However, the tannins are less expensive. By using both, in the preferred embodiment, cost savings can be obtained. An acceptable maleic anhydride copolymer may be obtained from Ciba Specialty Chemicals Corp. of Suffolk, Va.

In a preferred embodiment, the polyacrylate copolymer thinning rheology modifier is provided in the drilling mud in concentrations between about 0.71 grams per liter and about 5.7 grams per liter and more preferably in concentrations of between about 1.4 and about 4.3 grams per liter. As discussed in more detail below, the preferred embodiment of the invention is a dry drilling mud additive, which is mixed into water to make the drilling mud. To achieve the desired concentration, between about 0.25 and about 2.0 pounds of polyacrylate copolymer rheology modifier and preferably between about 0.5 and about 1.5 pounds of polyacrylate copolymer rheology modifier should be added per barrel (42 gallons) of water.

In another preferred embodiment, a maleic anhydride copolymer is used as the thinning rheology modifier. In this embodiment, the maleic anhydride copolymer is provided in the drilling mud in concentrations of between about 0.71 and about 5.7 grams per liter and more preferably between about 1.4 and about 4.3 grams per liter. As discussed in more detail below, the preferred embodiment of the invention is a dry drilling mud additive, which is mixed into water to make the drilling mud. To achieve the desired concentration, between about 0.25 and about 2.0 pounds of maleic anhydride copolymer rheology modifier and preferably between about 0.25 and about 1.5 pounds of maleic anhydride copolymer rheology modifier should be added per barrel (42 gallons) of water. An acceptable maleic anhydride copolymer may be obtained from SKW Chemicals Corp. of Marietta, Ga.

Micronized fibers, preferably finely ground plant materials or parts thereof, are also included in the preferred embodiment. Many different types of materials can be used to provide the micronized fibers including natural and synthetic organic fibers, glass fibers, carbon fibers, inorganic fibers, rock wool fibers, metal fibers and mixtures thereof. The fibers can be of a variety of shapes ranging from simple round or ovals to fibers having complex trilobed, figure eight, star shaped, or rectangular cross-sections. Curved, crimped, spiral shaped and other three dimensional fiber geometries may be used as well. Similarly, fibers with one or more hooked ends may be used.

The fibers sense to reduce the friction in the mud and to enhance the flow dynamics of the mud. It is believed that when the drilling mud is pumped along a tubular structure, such as the space between the well bore wall and the drill string, the solids in the mud will align along the center of the structure, destabilizing fluid flow and increasing friction. However, sufficient fibrous materials in the mud are believed to disperse the mud solids across the mud column. In any event, the presence of fibrous material in the mud effects a reduction in pressure in the mud.

The fibrous materials also slow the settling rate of the mud solids, thereby permitting the use of lesser amounts of gelling rheology modifiers. A reduced settling rate or higher gel strength will inhibit the formation of cutting beds— collections of cuttings and other mud solids at a point in the well bore. In turn, this will make it less likely that the bit or drill stem will become stuck. Also, the fibrous materials will help the mud stream flow as a plug, which will reduce erosion of the well bore.

The fibrous materials also help form the mud filter cake. They are particularly suited to filling larger openings in fractured or otherwise highly permeable formations. This helps to reduce mud loss and to minimize the chance of differential sticking in depleted sands.

In the preferred embodiment, the micronized fibers are provided in the drilling mud in concentrations between about 2.9 grams per liter and about 14.3 grams per liter and more preferably in concentrations of between about 5.7 and about 11.4 grams per liter. As discussed in more detail below, the preferred embodiment of the invention is a dry drilling mud additive, which is mixed into water to make the drilling mud. To achieve the desired concentration, between about 1.0 and about 5.0 pounds of the micronized fibers and preferably between about 2.0 and about 4.0 pounds of the micronized fibers should be added per barrel (42 gallons) of water.

Another preferred component of the drilling mud is calcium carbonate, preferably having a particle size between about 1 and about 100 microns and more preferably between about 5 and about 74 microns. Calcium carbonate is particularly useful for blocking off fractured formations and depleted sands, highly permeable formations whose pressure is typically lower than the hydrostatic pressure of the mud column. This prevents mud loss and the related problem of differential sticking. Additionally, calcium carbonate helps keep the dry mixture flowable.

In the preferred embodiment, calcium carbonate is provided in the drilling mud in concentrations between about 5.7 grams per liter and about 71.4 grams per liter and more preferably in concentrations of between about 5.7 and about 28.6 grams per liter. As discussed in more detail below, the preferred embodiment of the invention is a dry drilling mud additive, which is mixed into water to make the drilling mud. To achieve the desired concentration, between about 2.0 and about 25.0 pounds of calcium carbonate and preferably between about 2.0 and about 10.0 pounds of calcium carbonate should be added per barrel (42 gallons) of water.

The drilling mud should preferably have a pH of about 7.0 to about 9.5. A neutral to moderately basic pH is desirable to minimize clay dispersion, mud solids build up, and permeability damage to productive zones. A moderately basic mud pH will also to help the hydration buffers, and particularly humic acid, become water soluble. In high pH conditions, the clay particles may become more readily hydrated and become dispersed. When this occurs in the formation surrounding the well bore, particularly low pressure sands containing clay particles, the dispersed clay may slow or prevent the flow of petroleum from the formation to the well bore, inhibiting production. When the clay particles become hydrated and dispersed in the mud stream they may become too small to be removed, which will increase the solids content of the mud and may result in the viscosity and yield point becoming excessively high.

The desired pH may be achieved by adding sufficient quantities of any standard base such as NaOH to the mixture. However, the inventor prefers to use bases such as KOH, $Ca(OH)_2$ or $K_2CO_3$. In the preferred embodiment, anhydrous potassium carbonate, $K_2CO_3$, is provided in the drilling mud in concentrations between about 0.71 grams per liter and about 5.7 grams per liter and more preferably in concentrations between about 2.9 and about 4.3 grams per liter. Additionally, $Ca(OH)_2$ is provided in the drilling mud in concentrations between about 0.71 and about 5.7 grams per liter and more preferably in concentrations between about 0.71 and about 2.9 grams per liter. As discussed in more detail below, the preferred embodiment of the invention is a dry drilling mud additive, which is mixed into water to make the drilling mud. To achieve the desired concentration, between about 0.25 and about 2.0 pounds of the $K_2CO_3$ and preferably between about 1.0 and about 1.5 pounds of the $K_2CO_3$ should be added per barrel (42 gallons) of water. Likewise, between about 0.25 and about 2.0 pounds of $Ca(OH)_2$ and preferably between about 0.25 and about 1.0 pound of $Ca(OH)_2$ should be added per barrel (42 gallons) of water. In one embodiment, the anhydrous potassium carbonate may be omitted.

Although it is often desired to have a drilling mud that is neutral to slightly basic, many circumstances, such as mud contamination with $CO_2$ gases or salt water, require a higher pH. The mud system of the present invention can be operated at such elevated pH levels if desired.

In addition to serving as a pH modifier, the $Ca(OH)_2$ is useful for its calcium. The calcium in the mud will combine with carbonate gases that escape from the formation into the mud stream to form calcium carbonate. The calcium carbonate will precipitate and can then be removed from the mud.

Where increased carrying capacity of the drilling mud is desired in order to suspend mud solids and cuttings, it may be desirable to increase the gel strength of the drilling mud. This can be accomplished by including an organic polymer such as xanthan gum, guar gum or hydroxyethyl cellulose in the mix or by adding it to the drilling fluid after mixing. Another gelling rheology modifier which may be used to increase the gel strength is bentonite (sodium montmorillonite). As noted above, the desired gel strength of the mud is preferably between about three and about twelve pounds of force per hundred square feet, and more preferably between about four and about six pounds force (lbf) per hundred square feet, as measured when the mud has been at rest for ten minutes. The related mud characteristic, yield point, should preferably be from about five to about twenty pounds force (lbf) per hundred square feet, and preferably between about eight and about twelve pounds force (lbf) per hundred square feet.

Several factors affect the gel strength needed. Principally, however, the operator is balancing gel strength and yield point against the formation fracture gradient. The greater the volume of cuttings and cavings, the more important a high gel strength is in order to keep those solids in suspension. Similarly, the closer the well bore angle is to horizontal, the more important gel strength is. In a nearly vertical well bore, the solids typically have a long way to fall. Thus, a well can be shut down for an extended time before the solids would fall out of the mud stream. However, in a nearly horizontal well bore, the suspended particles need only fall the width of the well bore to settle out of the mud stream. Therefore, as the well angle relative to vertical increases, higher gel strengths are required.

Increased gel strength often means an increased yield point. This can be a problem because it means that greater pressure is required to get the mud stream moving again. If the pressure on the mud exceeds the fracture gradient of the formation, the formation may rupture before the mud begins moving, and mud may be lost to the formation. Thus, as noted above, a drilling mud should preferably be thixotropic.

In a preferred embodiment, a gelling rheology agent in the form of xanthan gum is provided in the drilling mud in concentrations between about 0.29 grams per liter and about 2.9 grams per liter and more preferably in concentrations between about 0.43 and about 1.4 grams per liter. As discussed in more detail below, the preferred embodiment of the invention is a dry drilling mud additive, which is mixed into water to make the drilling mud. To achieve the desired concentration, between about 0.1 and about 1.0 pounds of xanthan gum and preferably between about 0.15 and about 0.5 pounds of xanthan gum should be added per barrel (42 gallons) of water.

In another preferred embodiment, a gelling rheology agent in the form of sodium montmorillonite (bentonite) is also included. Sodium montmorillonite may be used in lieu of or in addition to xanthan gum. Sodium montmorillonite is provided in the drilling mud in concentrations between about 5.7 grams per liter and about 71.3 grams per liter and more preferably in concentrations between about 14.3 and about 48.8 grams per liter. As discussed in more detail below, the preferred embodiment of the invention is a dry drilling mud additive, which is mixed into water to make the drilling mud. To achieve the desired concentration, between about 2.0 and about 25.0 pounds of sodium montmorillonite and preferably between about 5.0 and about 15.0 pounds of sodium montmorillonite should be added per barrel (42 gallons) of water.

A better filter cake can be established by including a high quality clay in the mud. Sodium montmorillonite is the inventor's preferred clay. It is sold as dry bentonite powder, available from Black Hills Bentonite, LLC of Mills, Wyo.

In some instances it may be preferable to add a gelling rheology modifier after the mud has been mixed in order to adjust the mud's yield point and gel strength in view of drilling conditions. Similarly, in some instances, no additional gelling rheology modifier will be required.

Although the invention is described in terms of a single mud composition and it could easily be mixed to provide one mix, the inventor anticipates making two separate dry mixes. The first will contain the hydration buffer (preferably humic acid), the shale stabilizers (preferably potassium acetate and/or PHPA) and filter cake components such as cellulose polymer (preferably PAC) and sulfonated asphalt. The second mix will contain a thinning rheology modifier (preferably sulfoalkylated tannin and/or maleic anhydride copolymer); micronized fiber; calcium carbonate; a pH modifier (preferably Ca(OH)$_2$, potassium hydroxide, and/or anhydrous potassium carbonate); a gelling rheology modifier (preferably xanthan gum); and a high quality clay (preferably sodium montmorillonite). The first mix should preferably contain the following components in concentrations of at least about the amounts listed below. The preferred concentrations of the second mix components follows.

| Component | Percent, By Weight | Pounds Per Barrel |
|---|---|---|
| First Mix | | |
| Leonardite (85% Humic Acid) | 49.5 (42.1) | 11 |
| Potassium Acetate | 13.5 | 3 |
| PHPA | 3.2 | 0.7 |
| PAC | 6.8 | 1.5 |
| Sulfonated Asphalt | 27.0 | 6 |
| Second Mix | | |
| Sulfoalkylated Tannin | 16.0 | 1.25 |
| Maleic Anhydride Copolymer | 6.4 | 0.5 |

-continued

| Component | Percent, By Weight | Pounds Per Barrel |
|---|---|---|
| Micronized Fiber | 46.2 | 3.6 |
| Calcium Carbonate | 25.6 | 2 |
| Calcium Hydroxide | 5.8 | 0.45 |

In a preferred embodiment, the second mix component will comprise at least about 5.0 percent by weight of a first rheology agent selected from the group consisting of sulfoalkylated tannins, lignosulfonate, copolymers of acrylic acid and polyacrylic acid, polystyrene maleic anhydride copolymer, 2-acrylomido-2-methylpropane sulfonic acid polymer, and combinations thereof.

In mixing the preferred embodiment of the dry mixes, the components should preferably be mixed in the order listed in the foreground charts. The components should be added to a dry ribbon-type blender in the ratios outlined and mixed until homogenous. The two separate powder mixes should preferably be stored in plastic lined, moisture proof bags or bulk tanks. In the preferred embodiment, rather than storing the mixes in powder form, the mixes may be compressed into pellets having a volume from about 0.25 cubic centimeters to about 10 cubic centimeters. This will increase the bulk density of the powder by a factor of about 25 to 75 percent, thereby substantially facilitating storage and shipping.

The first mix may be used independently as a shale stabilizer and mud filtrate reducer by adding it directly to fresh water, salt water, or an existing drilling fluid through a chemical hopper at a concentration between about 10 and about 30 pounds, and preferably about 25 pounds, per barrel (42 gallons). The second mix could be used as a sealant in existing mud systems. The concentrations needed of the second mix when it is used as a separate sealant will vary depending upon the needs of the existing system.

Where a total mud system is required, the two mixes should be combined. A drilling mud may be formed by mixing between about 20 pounds and about 40 pounds, and preferably about 30 pounds, of the combined blend per barrel (42 gallons) of fresh or salt water, while circulating with a centrifugal pump and stirring with a paddle agitator, at ambient temperature until a homogenous mixture is obtained, typically between 30 and 60 minutes. Sufficient base, preferably KOH, is added to the water prior to mixing to raise the pH to about 12.8. The dry mix components will lower the pH to the desired levels.

When the drilling mix is added to an existing mud, a presolubilizing step is preferred. Approximately one hundred fifty barrels of water are mixed with sufficient KOH to raise the pH to about 13.5. Roughly 60 pounds of combined mix is added per barrel (~9000 pounds), and then mixed as described above. The addition of the dry mix ingredients lowers the pH to the desired level. When mixing is complete, the resultant fluid is added to the existing mud.

The drilling mud formed pursuant to the foregoing instructions will be an unweighted drilling mud, or at least not an intentionally weighted mud. Muds are weighted to hold back the formation pressure and thereby prevent the petroleum from entering the well bore. Muds made from the present additives can be weighted by adding minerals such as barite, calcium carbonate or hematite, if desired. Thinning or gelling rheology agents and/or pH modifiers may be added at this stage to adjust the mud properties, if needed.

Other uses and embodiments of the invention will occur to those skilled in the art from the foregoing disclosure, and

I claim:

1. A substantially water soluble additive mixture for addition to a drilling fluid, said additive mixture comprising:
   a shale stabilizer selected from the group consisting of an alkali metal acetate, partially hydrolyzed polyacrylate-polyacrylamide copolymer, and combinations thereof; and
   a hydration buffer comprising humic acid, said hydration buffer provided in sufficient amount to inhibit substantial absorption of water from the atmosphere whereby said mixture will remain substantially dry and flowable.

2. A substantially water soluble additive mixture for addition to a drilling fluid according to claim 1 wherein said alkali metal acetate comprises potassium acetate.

3. A substantially water soluble additive mixture for addition to a drilling fluid according to claim 2 wherein said potassium acetate is provided in quantities sufficient to yield concentrations of between about 2.9 and about 14.3 grams per liter of said drilling fluid.

4. A substantially water soluble additive mixture for addition to a drilling fluid according to claim 1 wherein said partially hydrolyzed polyacrylate-polyacrylamide copolymer has a molecular weight between about 1 million and about 8 million.

5. A substantially water soluble additive mixture for addition to a drilling fluid according to claim 4 wherein said partially hydrolyzed polyacrylate-polyacrylamide copolymer is provided in quantities sufficient to yield concentrations between about 0.71 and about 5.7 grams per liter of said drilling fluid.

6. A substantially water soluble additive mixture for addition to a drilling fluid according to claim 1 wherein said humic acid is provided in quantities sufficient to yield concentrations of between about 4.9 and about 36.4 grams per liter of said drilling fluid.

7. A substantially water soluble additive mixture for addition to a drilling fluid according to claim 1 wherein said humic acid is provided in the form of leonardite.

8. A substantially water soluble additive mixture for addition to a drilling fluid according to claim 7 wherein said leonardite is provided in quantities sufficient to yield concentrations between about 5.7 and about 42.9 grams per liter of said drilling fluid.

9. A substantially water soluble additive mixture for addition to a drilling fluid according to claim 1 further comprising a cellulose polymer.

10. A substantially water soluble additive mixture for addition to a drilling fluid according to claim 9 wherein said cellulose polymer is selected from the group consisting of polyanionic cellulose polymer, carboxymethylcellulose, and combinations thereof.

11. A substantially water soluble additive mixture for addition to a drilling fluid according to claim 9 wherein said cellulose polymer is provided in quantities sufficient to yield concentrations between about 0.71 and 11.4 grams per liter of said drilling fluid.

12. A substantially water soluble additive mixture for addition to a drilling fluid according to claim 1 further comprising a sealant selected from the group consisting of asphalts, gilsonite, carbon black, graphite, and combinations thereof.

13. A substantially water soluble additive mixture for addition to a drilling fluid according to claim 12 wherein said sealant comprises an asphalt.

14. A substantially water soluble additive mixture for addition to a drilling fluid according to claim 13 wherein said asphalt further comprises a sulfonated asphalt.

15. A substantially water soluble additive mixture for addition to a drilling fluid according to claim 13 wherein said asphalt is provided in quantities sufficient to yield concentrations between about 5.71 and about 28.6 grams per liter of said drilling fluid.

16. A substantially water soluble drilling fluid mix comprising:
    a first mix component comprising at least about 42.1 percent by weight humic acid; at least about 13.5 percent by weight alkali metal acetate; at least about 3.2 percent by weight partially hydrolyzed polyacrylate-polyacrylamide copolymer; at least about 6.8 percent by weight cellulose polymer; and at least about 27.0 percent by weight of a sealant selected from the group consisting of asphalts, gilsonite, carbon black, graphite, and combinations thereof; and
    a second mix component comprising at least about 5.0 percent by weight of a first rheology agent selected from the group consisting of sulfoalkylated tannins, lignosulfonate, copolymers of acrylic acid and polyacrylic acid, polystyrene maleic anhydride copolymer, 2-acrylomido-2-methylpropane sulfonic acid polymer, and combinations thereof.

17. A substantially water soluble drilling fluid mix according to claim 16 wherein said second mix component further comprises at least about 46.2 percent by weight of a micronized fiber.

18. A substantially water soluble drilling fluid mix according to claims 17 wherein said micronized fiber is selected from a group consisting of natural organic fibers, synthetic organic fibers, glass fibers, carbon fibers, inorganic fibers, rock wool fibers, metal fibers and mixtures thereof.

19. A substantially water soluble drilling fluid mix according to claim 16 wherein said second mix component further comprises at least about 25.6 percent by weight of calcium carbonate.

20. A substantially water soluble drilling fluid mix according to claim 16 wherein said second mix component comprises a second rheology agent in sufficient quantities to establish a yield point of at least about 5 pounds force per 100 square feet in a solution formed from mixing said first and second mixtures with water to form a drilling fluid.

21. A substantially water soluble drilling fluid mix according to claim 20 wherein said second rheology agent comprises an organic polymer selected from the group consisting of xanthan gum, guar gum, hydroxyethyl cellulose, and combinations thereof.

22. A substantially water soluble drilling fluid mix according to claim 16 wherein said second mix component further comprises a pH modifying agent in sufficient quantities to maintain a pH of at least about 7 in a solution formed from mixing said first and second mix components with water to form a drilling fluid.

23. A substantially water soluble drilling fluid mix according to claim 22 wherein said pH modifying agent is selected from the group consisting of calcium hydroxide, potassium hydroxide, sodium carbonate, potassium carbonate, and combinations thereof.

24. A substantially water soluble drilling fluid mix according to claim 16 wherein said alkali metal acetate comprises potassium acetate.

25. A substantially water soluble drilling fluid mix according to claim 16 wherein said cellulose polymer is selected from the group consisting of polyanionic cellulose polymer, carboxymethylcellulose, and combinations thereof.

26. A substantially water soluble drilling fluid mix according to claim 16 wherein said sealant comprises an asphalt.

27. A substantially water soluble drilling fluid mix according to claim 26 wherein said asphalt comprises a sulfonated asphalt.

28. A substantially water soluble drilling fluid mix according to claim 16 further comprising clay.

29. A substantially soluble drilling fluid mix according to claim 28 wherein said clay comprises sodium montmorillonite.

30. A substantially soluble drilling fluid mix according to claim 16 wherein said first mix component is dry and flowable.

31. A substantially soluble drilling fluid mix according to claim 30 wherein said second mix component is dry and flowable.

32. A substantially soluble drilling fluid mix according to claim 16 wherein said first mix component is pelletized.

33. A substantially soluble drilling fluid mix according to claim 32 wherein said second mix component is pelletized.

34. A method of stabilizing shale in an existing borehole having a drilling fluid comprising mixing an additive into said drilling fluid, said additive comprising:
   between about 0.71 and about 5.71 grams of a partially hydrolyzed polyacrylate-polyacrylamide copolymer per liter of said drilling fluid;
   between about 2.9 and about 14.3 grams of an alkali metal acetate per liter of said drilling fluid;
   between about 4.8 and about 36.5 grams of humic acid per liter of said drilling fluid;
   between about 0.71 and about 11.4 grams of cellulose polymer per liter of said drilling fluid;
   between about 5.7 and about 28.6 grams of a sealant selected from the group consisting of asphalts, gilsonite, carbon black, graphite, and combinations thereof per liter of said drilling fluid; and
   circulating said drilling fluid with said additives through said borehole.

35. A method of stabilizing shale in an existing borehole having a drilling fluid according to claim 34 wherein said additive further comprises between about 1.4 and about 14.3 grams per liter of a rheology agent selected from the group consisting of sulfoalkylated tannins, lignosulfonate, copolymers of acrylic acid and polyacrylic acid, polystyrene maleic anhydride copolymer, 2-acrylomido-2-methylpropane sulfonic acid polymer, and combinations thereof.

36. A substantially water soluble additive mixture for addition to a drilling fluid, said additive mixture comprising:
   a shale stabilizer selected from the group consisting of an alkali metal acetate, partially hydrolyzed polyacrylate-polyacrylamide copolymer, and combinations thereof;
   a sufficient amount of hydration buffer to inhibit substantial absorption of water from the atmosphere whereby said mixture will remain substantially dry and flowable; and
   a sealant selected from the group consisting of asphalts, gilsonite, carbon black, graphite, and combinations thereof.

37. A substantially water soluble additive mixture for addition to a drilling fluid according to claim 36 wherein said sealant comprises an asphalt.

38. A substantially water soluble additive mixture for addition to a drilling fluid according to claim 37 wherein said asphalt further comprises a sulfonated asphalt.

39. A substantially water soluble additive mixture for addition to a drilling fluid according to claim 37 wherein said asphalt is provided in quantities sufficient to yield concentrations between about 5.71 and about 28.6 grams per liter of said drilling fluid.

40. A substantially water soluble additive mixture for addition to a drilling fluid according to claim 36 wherein said alkali metal acetate comprises potassium acetate.

41. A substantially water soluble additive mixture for addition to a drilling fluid according to claim 40 wherein said potassium acetate is provided in quantities sufficient to yield concentrations of between about 2.9 and about 14.3 grams per liter of said drilling fluid.

42. A substantially water soluble additive mixture for addition to a drilling fluid according to claim 36 wherein said partially hydrolyzed polyacrylate-polyacrylamide copolymer has a molecular weight between about 1 million and about 8 million.

43. A substantially water soluble additive mixture for addition to a drilling fluid according to claim 42 wherein said partially hydrolyzed polyacrylate-polyacrylamide copolymer is provided in quantities sufficient to yield concentrations between about 0.71 and about 5.7 grams per liter of said drilling fluid.

44. A substantially water soluble additive mixture for addition to a drilling fluid according to claim 36 further comprising a cellulose polymer.

45. A substantially water soluble additive mixture for addition to a drilling fluid according to claim 44 wherein said cellulose polymer is selected from the group consisting of polyanionic cellulose polymer, carboxymethylcellulose, and combinations thereof.

46. A substantially water soluble additive mixture for addition to a drilling fluid according to claim 44 wherein said cellulose polymer is provided in quantities sufficient to yield concentrations between about 0.71 and 11.4 grams per liter of said drilling fluid.

* * * * *